US 12,221,764 B2

(12) United States Patent
Lim et al.

(10) Patent No.: US 12,221,764 B2
(45) Date of Patent: Feb. 11, 2025

(54) AUTOMATED GROUND LEVELING USING ARTIFICIAL NEURAL NETWORK

(71) Applicant: Deere & Company, Moline, IL (US)

(72) Inventors: Tien-Chuong Lim, Grovetown, GA (US); Christopher T. McCord, Thomson, GA (US); Benjamin Seth Peavy, Harlem, GA (US)

(73) Assignee: DEERE & COMPANY, Moline, IL (US)

( * ) Notice: Subject to any disclaimer, the term of this patent is extended or adjusted under 35 U.S.C. 154(b) by 849 days.

(21) Appl. No.: 17/445,228

(22) Filed: Aug. 17, 2021

(65) Prior Publication Data

US 2022/0090352 A1 Mar. 24, 2022

Related U.S. Application Data

(60) Provisional application No. 62/706,940, filed on Sep. 18, 2020.

(51) Int. Cl.
*E02F 3/84* (2006.01)
*A01B 63/111* (2006.01)
*G06N 3/048* (2023.01)
*E02F 3/76* (2006.01)

(52) U.S. Cl.
CPC ............ *E02F 3/844* (2013.01); *A01B 63/111* (2013.01); *G06N 3/048* (2023.01); *E02F 3/7631* (2013.01)

(58) Field of Classification Search
CPC ...... A01B 31/00; A01B 63/111; E02F 3/7631; E02F 3/844; G06N 3/02
See application file for complete search history.

(56) References Cited

U.S. PATENT DOCUMENTS

| 6,749,035 | B2 * | 6/2004 | Bundy | ................... E02F 9/2257 180/41 |
| 9,980,422 | B2 * | 5/2018 | Czapka | ................ A01B 59/042 |
| 10,736,255 | B2 * | 8/2020 | Czapka | ................ A01B 63/22 |

(Continued)

FOREIGN PATENT DOCUMENTS

| JP | H02186902 A | 7/1990 |
| JP | H0928113 A | 2/1997 |
| JP | 2007129918 A | 5/2007 |

OTHER PUBLICATIONS

Extended European Search Report and Written Opinion issued in European Patent Application No. 21195900.2, dated Feb. 18, 2022, in 10 pages.

*Primary Examiner* — Gary S Hartmann (57) ABSTRACT

A surface grading system includes a traction unit and a scraper implement attached thereto via a three-point hitch system. A controller automatically controls an actuator of the three-point hitch system to automatically adjust a position of the scraper implement relative to the traction unit to automatically profile the ground surface to achieve a desired profile. The controller includes an Artificial Neural Network that receives a pitch angle of the traction unit and a leveling variation as input values, and outputs a hitch control signal. The Artificial Neural Network includes a first layer using a logarithmic sigmoid function as an activation function, and an output layer using a linear function as an activation function. The hitch control signal raises or lowers the three-point hitch system as the traction unit moves across the ground surface.

24 Claims, 6 Drawing Sheets

(56) References Cited

U.S. PATENT DOCUMENTS

| | | | |
|---|---|---|---|
| 10,752,237 B2* | 8/2020 | Peterson | B60W 30/02 |
| 10,813,266 B2* | 10/2020 | Czapka | A01B 63/14 |
| 10,849,263 B2* | 12/2020 | Lee | A01B 63/112 |
| 10,907,325 B2* | 2/2021 | Ishibashi | E02F 9/262 |
| 10,912,244 B2* | 2/2021 | Kilby | A01B 59/004 |
| 11,882,781 B2* | 1/2024 | Albrecht | A01B 59/041 |
| 12,010,938 B2* | 6/2024 | Disberger | A01B 59/06 |
| 2024/0099174 A1* | 3/2024 | Billich | A01B 63/1006 |
| 2024/0172580 A1* | 5/2024 | Schroeder | G01S 13/88 |

\* cited by examiner

AUTOMATED GROUND LEVELING USING ARTIFICIAL NEURAL NETWORK

CROSS-REFERENCE TO RELATED APPLICATIONS

This application claims the benefit of U.S. Provisional Patent Application Ser. No. 62/706,940, filed on Sep. 18, 2020, the disclosure of which is hereby incorporated by reference.

TECHNICAL FIELD

The disclosure generally relates to a surface grading system and a method of grading a ground surface with the surface grading system.

BACKGROUND

Agricultural traction units may include a three-point hitch system for attaching various different implements to the traction unit. In some implementations, the traction unit be configured and/or referred to as a tractor. The three-point hitch system includes a first lower arm and a second lower arm arranged on a substantially common plane, and an upper arm positioned vertically above and laterally between the first lower arm and the second lower arm. Each of the first lower arm, the second lower arm, and the upper arm are pivotably attached to and interconnect the tractor and an implement. The distal ends of the first lower arm, the second lower arm, and the upper arm are spaced apart to form a triangular attachment system. At least one of the first lower arm, the second lower arm, and the upper arm includes an actuator that is selectively controllable to raise and lower the three-point hitch system, thereby raising and/or lowering the implement attached thereto. For example, the first lower arm and the second lower arm may each include a hydraulic cylinder that extends and retracts to raise and lower the implement attached to the three-point hitch system.

An example implement that may be attached to the three-point hitch system includes a scraper implement. The scraper implement may be referred to as a scraper blade, a box blade, a box scraper, a grading scraper, etc. The scraper implement is drawn behind the tractor across a ground surface to redistribute earth for shaping and/or altering the contour of the ground surface. When using scraper implements that are attached to the tractor with the three-point hitch system, the height or elevation of the scraper implement relative to the tractor is generally controlled by an operator using manual adjustment of the three-point hitch system. Traditional ground leveling with no electronics assistance requires a constant control and adjustment of scraper implement height, and simultaneously looking behind the tractor to gauge the quality of leveling work. Operational control in this manner leads to neck, hand, and arm fatigue, because the operator must continuously look behind to determine the proper height adjustment for the current position and/or orientation of the tractor and/or scraper implement in order for the scraper implement to achieve the desired elevation of the ground surface.

SUMMARY

A method of grading a ground surface with a surface grading system is provided. The surface grading system includes a traction unit having a three-point hitch system, and a scraper implement that is attached to the three-point hitch system and that is drawn behind the traction unit. The method includes sensing a pitch angle of the traction unit at a current location of the traction unit with an angle sensor. The pitch angle of the traction unit is then communicated to a controller. A leveling variation is calculated with the controller. The leveling variation is a numerical difference between a current elevation of a cutting edge of the scraper implement and a desired elevation of the ground surface at a current location of the cutting edge of the scraper implement. A hitch control signal is generated with the controller based on the pitch angle of the traction unit and the leveling variation. The hitch control signal is operable to control the three-point hitch system to adjust a vertical position of the cutting edge of the scraper implement relative to the traction unit.

In one aspect of the disclosure, the controller includes an Artificial Neural Network (ANN) that is configured to receive the pitch angle and the leveling variation as input values, and output the hitch control signal as an output value. The Artificial Neural Network includes a first layer and an output layer. The first layer may be configured to use a logarithmic sigmoid function as an activation function of the first layer. The output layer may be configured to use a linear function as an activation function of the output layer.

In one aspect of the disclosure, the method of grading the ground surface includes sensing a current location of the traction unit with a position sensor. The current position of the traction unit is then communicated to the controller. The controller may then calculate the current location of the cutting edge of the scraper implement using the current location of the traction unit, the pitch angle of the traction unit at the current location of the traction unit, and an identifiable dimension of the traction unit or the scraper implement. The identifiable dimension of the traction unit or the scraper implement may include, but is not limited to, a length of the traction unit, a wheelbase of the traction unit, a length of the scraper implement, a distance along a longitudinal axis of the traction unit between a front tire contact position and a rotation point of the three-point hitch system, etc. Calculating the current location of the cutting edge of the scraper implement may include calculating the elevation of the cutting edge of the scraper element.

In one aspect of the disclosure, the method of grading the ground surface may include inputting the desired elevation of the ground surface into the controller. The desired elevation of the ground surface may include a horizontal elevation, or a three-dimensional profile defined by a map, contours, multiple datapoints, etc.

In one aspect of the disclosure, the method of grading the ground surface may include moving an actuator of the three-point hitch system in response to the hitch control signal. The actuator controls a position fo the three-point hitch system relative to the traction unit. By moving the actuator of the three-point hitch system, the vertical position of the cutting edge of the scraper implement relative to the traction unit is altered.

A surface grading system is also provided. The surface grading system includes a traction unit including a three-point hitch system, and a scraper implement attached to the three-point hitch system. The three-point hitch system includes an actuator that is selectively controllable between a plurality of different positions to adjust a position of the scraper implement relative to the traction unit. The scraper implement includes a cutting edge that is configured for shaping a ground surface. A position of the cutting edge relative to the traction unit is adjustable in response to movement of the actuator. An angle sensor is operable to sense data related to a pitch angle of the traction unit. A controller is disposed in communication with the angle sensor and the actuator. The controller includes a processor and a memory having a grading control algorithm stored thereon. The processor is operable to execute the grading control algorithm to receive a desired elevation of the ground surface from an operator via a user input. The controller further receives a pitch angle of the traction unit at a current location of the traction unit from the angle sensor. The controller may then calculate a leveling variation. The leveling variation is a numerical difference between a current elevation of the cutting edge of the scraper implement and the desired elevation of the ground surface at a current location of the cutting edge of the scraper implement. The controller may then generate a hitch control signal based on the pitch angle of the traction unit and the leveling variation. The hitch control signal is applied to the actuator of the three-point hitch system to adjust a vertical position of the cutting edge of the scraper implement relative to the traction unit.

In one aspect of the disclosure, the controller includes an Artificial Neural Network (ANN) that is configured to receive the pitch angle and the leveling variation as input values, and output the hitch control signal as an output value. The Artificial Neural Network of the controller includes a first layer and an output layer. The first layer of the ANN uses a logarithmic sigmoid function as an activation function of the first layer. The output layer of the ANN uses a linear function as an activation function of the output layer. It has been discovered that the ANN, which uses the pitch angle and the leveling variation as inputs, and outputs the hitch control signal to raise or lower the three-point hitch is effective at automatically controlling the position of the scraper implement relative to the traction unit to achieve the desired ground surface profile.

In one aspect of the disclosure, the angle sensor may include, but is not limited to, an inertial measurement unit. The pitch angle is defined as an angle of rotation relative to a horizontal plane and about a transverse axis that extends through a center of gravity of the traction unit. The transverse axis is disposed on the horizontal plane, and is orthogonal to a central longitudinal axis of the traction unit. The central longitudinal axis of the traction unit extends through the center of gravity of the traction unit, between a forward end and a rearward end of the traction unit. It should be appreciated that the angle sensor may include some other device capable of detecting and/or sensing data related to the pitch angle of the traction unit. For example, the angle sensor may include an accelerometer, a gyroscope, or some other device capable of sensing data related to the orientation of the traction unit relative to the horizontal plane and/or about the transverse axis.

In one aspect of the disclosure, the traction unit may include a position sensor. The position sensor is operable to sense and/or detect data related to a geographic location of the traction unit. In one implementation, the position sensor may include, but is not limited to, a Global Positioning Satellite (GPS) system. The controller is in communication with the position sensor for receiving the data related to the geographic location of the traction unit. The position sensor allows the controller to track the movement of the traction unit over the ground surface, such that the process described herein may be applied across the entire ground surface to achieve the desired profile of the ground surface.

In one aspect of the disclosure, the processor may be configured and/or operable to execute the grading control algorithm to calculate the current location of the cutting edge of the scraper implement using the current location of the traction unit, the pitch angle of the traction unit at the current location of the traction unit, and an identifiable dimension of the traction unit or the scraper implement. The identifiable dimension of the traction unit or the scraper implement may include, but is not limited to, a length of the traction unit, a wheelbase of the traction unit, a length of the scraper implement, a distance along a longitudinal axis of the traction unit between a front tire contact position and a rotation point of the three-point hitch system, etc. Additionally, the processor may be configured and/or operable to execute the grading control algorithm to calculate the elevation of the cutting edge of the scraper element.

In one aspect of the disclosure, the three-point hitch system includes a first lower arm and a second lower arm arranged on a substantially common horizontal plane, and an upper arm positioned vertically above and laterally between the first lower arm and the second lower arm. In one implementation, the first lower arm, the second lower arm and the upper arm each include a respective forward end that is attached to the rearward end of the traction unit. Each of the first lower arm, the second lower arm and the upper arm extend from their respective forward end to a rearward distal end, which are each attached to the scraper implement. The actuator is coupled to one of the first lower arm, the second lower arm, or the upper arm. In one implementation, the actuator includes a hydraulic cylinder configured to extend or retract in response to the hitch control signal.

In one aspect of the disclosure, the processor is operable to execute the grading control algorithm to continuously generate the hitch control signal to continuously adjust the vertical position of the cutting edge of the scraper implement as the traction unit moves across the ground surface. In so doing, the controller continuously senses or tracks the location of the traction unit and the scraper implement as they move across the ground surface, continuously senses the pitch angle of the traction unit, continuously calculates the leveling variation, and continuously outputs or changes the hitch control signal as the traction unit moves across the ground surface.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
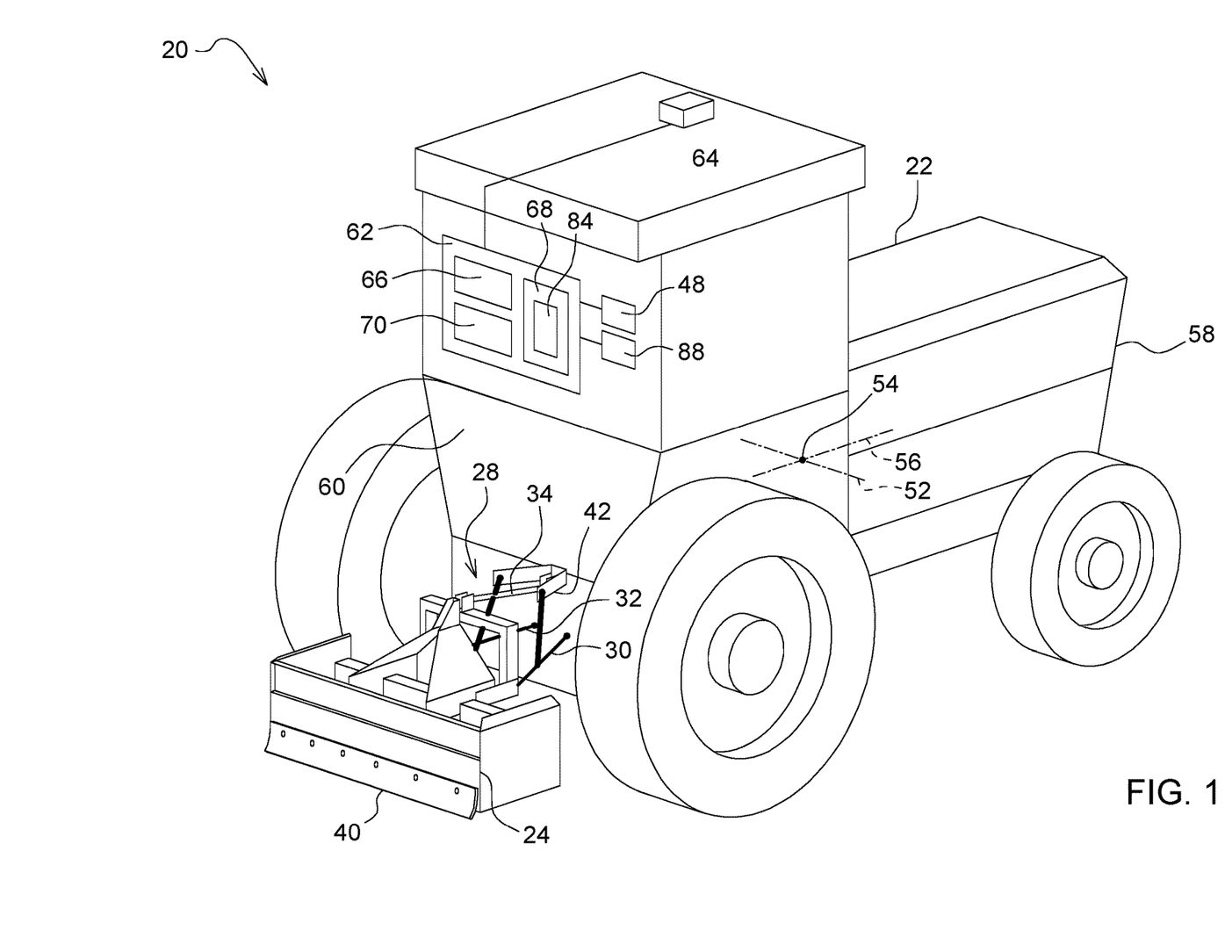
FIG. 1 is a schematic perspective view of a surface grading system.

Referring to the Figures, wherein like numerals indicate like parts throughout the several views, a surface grading system 20 is generally shown at 20. Referring to FIG. 1, the surface grading system 20 includes a combination of a traction unit 22 and a scraper implement 24. The traction unit 22 may include and/or be referred to as a tractor, agricultural tractor, dozer, bull-dozer, vehicle, work vehicle, etc. The traction unit 22 may be configured in a manner that provides motive power to move the traction unit 22 across a ground surface 26, such as but not limited to a field. While the example implementation shown in the Figures and described herein depicts the traction unit 22 as a conventional agricultural tractor, it should be appreciated that the teachings of this disclosure should not be limited to the implementation of the traction unit 22 shown and depicted herein.

The scraper implement 24 is attached to the traction unit 22. In the example implementation shown in the Figures and described herein, the traction unit 22 includes a three-point hitch system 28 disposed at a rearward end 60 of the traction unit 22. In other implementations, the three-point hitch system 28 may be positioned adjacent the forward end 58 of the traction unit 22. Furthermore, while the example implementation includes the traction unit 22 having the three-point hitch system 28 attaching the scraper implement 24 thereto, it should be appreciated that in other implementations of the disclosure, the scraper implement 24 may be attached to the traction unit 22 in some other manner that is not shown or specifically described herein.

Figure 2:
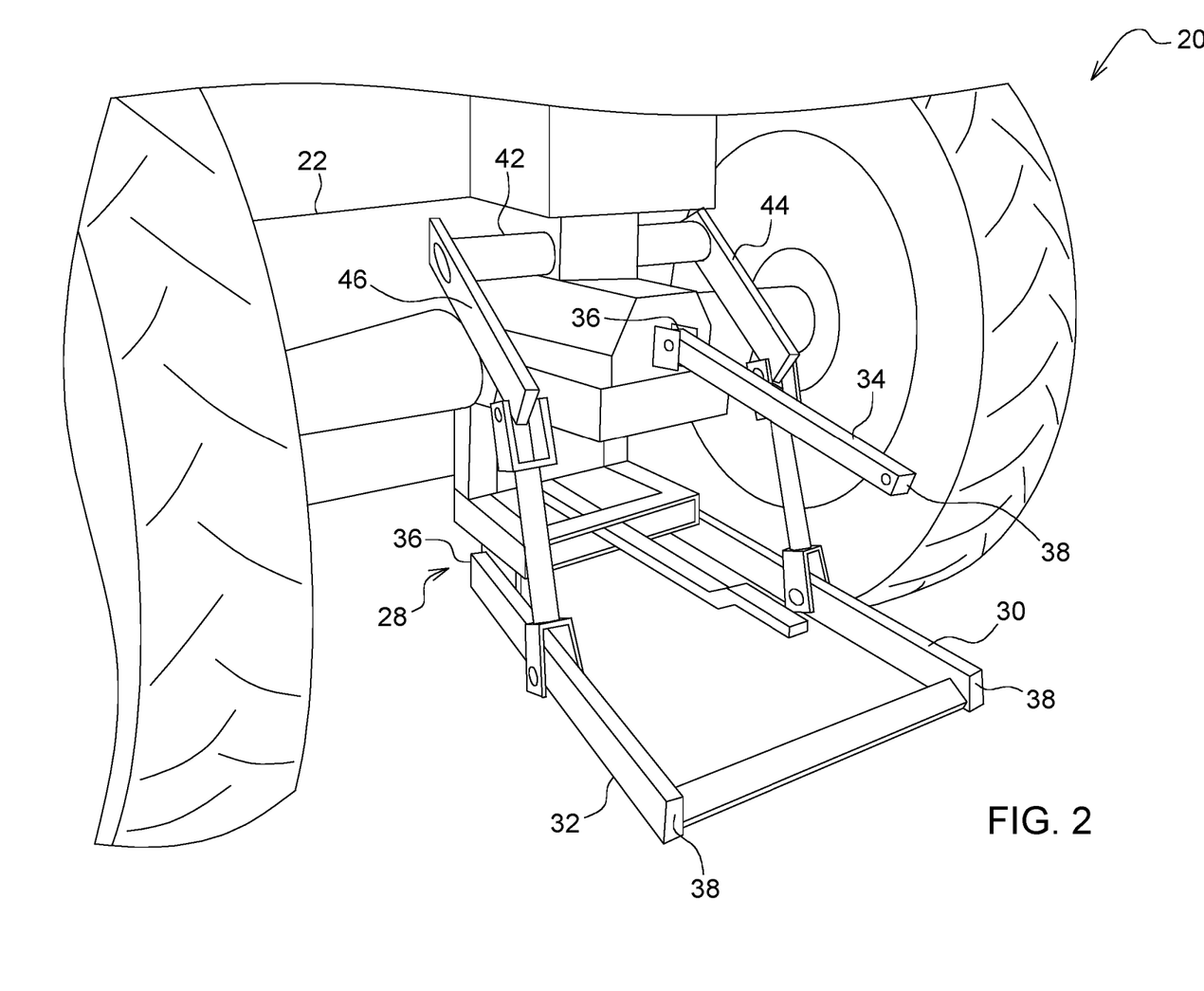
FIG. 2 is a schematic perspective view of a three-point hitch system.

Referring to FIG. 2, and as understood by those skilled in the art, the three-point hitch system 28 includes a first lower arm 30 and a second lower arm 32 arranged on a substantially common horizontal plane 50, and an upper arm 34 positioned vertically above and laterally between the first lower arm 30 and the second lower arm 32. The first lower arm 30, the second lower arm 32 and the upper arm 34 each include a respective first end 36, e.g., a respective forward end 58, that is attached to the traction unit 22, e.g., the rearward end 60 of the traction unit 22. Each of the first lower arm 30, the second lower arm 32 and the upper arm 34 extend from their respective first end 36 to a respective distal end 38. The scraper implement 24 is attached to each of the first lower arm 30, the second lower arm 32, and the upper arm 34 at their respective distal end 38s. One or more of the first lower arm 30, the second lower arm 32, and the upper arm 34 may be selectively controllable to move or the position and/or orientation of the scraper implement 24 relative to the traction unit 22.

Referring to FIG. 1, in the example implementation of the surface grading system 20 shown in the Figures and described herein, the scraper implement 24 is attached to the traction unit 22 via the three-point hitch system 28. The scraper implement 24 may be referred to as a scraper blade, a box blade, a box scraper, a grading scraper, etc. The scraper implement 24 includes a cutting edge 40 that is configured for contacting and shaping the ground surface 26. The specific type, shape, and construction of the scraper implement 24 other than described herein are not pertinent to the teachings of this disclosure, are understood by those skilled in the art, and are therefore not described in detail herein.

Referring to FIGS. 1 and 2, the traction unit 22 includes an actuator 42 that is selectively controllable between a plurality of different positions. The actuator 42 is configured for controlling a position of the scraper implement 24 relative to the traction unit 22. As such, a position of the cutting edge 40 relative to the traction unit 22 is adjustable in response to movement of the actuator 42 between the different positions of the actuator 42. In the example implementation described herein, the actuator 42 includes a hydraulic cylinder (not shown) operable to extend or retract in response to a flow of hydraulic fluid to at least one end of the hydraulic cylinder. The actuator 42 may be integrated with and/or coupled to the three-point hitch system 28. For example, the actuator 42 may be coupled to one of the first lower arm 30 or the second lower arm 32. More particularly, in one implementation, the actuator 42 includes a first arm actuator 44 coupled to the first lower arm 30 and a second arm actuator 46 coupled to the second lower arm 32. The first arm actuator 44 and the second arm actuator 46 operate in unison on the first lower arm 30 and the second lower arm 32 respectively. In the example implementation shown in the Figures and described herein, extension of the first arm actuator 44 and the second arm actuator 46 raises the scraper implement 24 and the cutting edge 40 relative to the traction unit 22, whereas retraction of the first arm actuator 44 and the second arm actuator 46 lowers the scraper implement 24 and the cutting edge 40 relative to the traction unit 22.

In alternative implementations, the actuator 42 may be embodied differently than the example implementation of the hydraulic cylinder described herein. For example, the actuator 42 may alternatively include an electric linear actuator 42, a pneumatic linear actuator 42, a rotary actuator 42, an electric motor, etc. Additionally, in alternative implementations, the actuator 42 may be coupled to the upper arm 34. It should be appreciated that the actuator 42 may form part are all of the first lower arm 30, the second lower arm 32, or the upper arm 34. Furthermore, it should be appreciated that the three-point hitch system 28 may further include other components interconnecting the actuator 42 and the first lower arm, the second lower arm 32, or the upper arm 34, such as but not limited to, linkages, levers, gear sets, shafts, etc.

Figure 3:
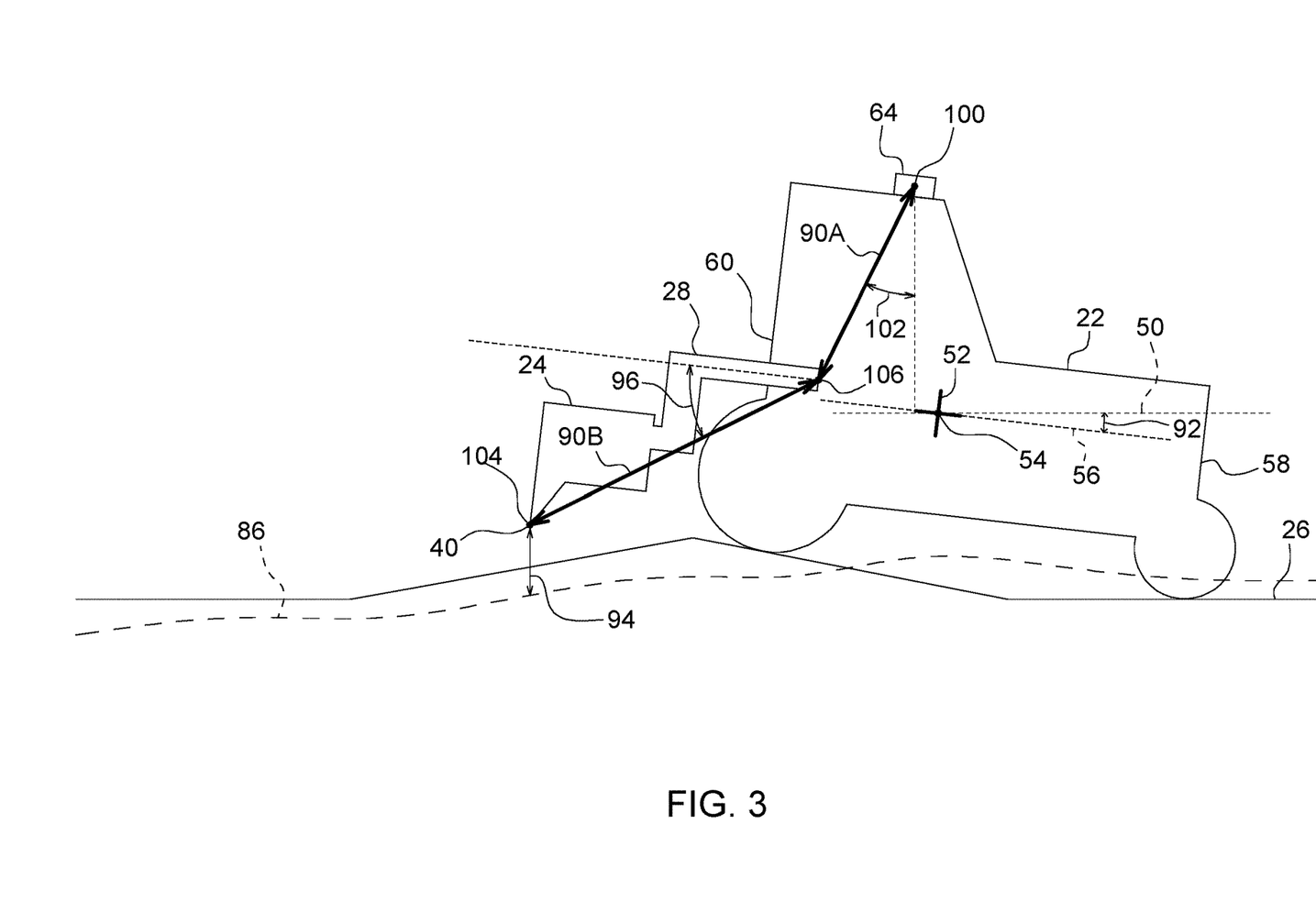
FIG. 3 is a schematic side profile view of the surface grading system on a ground surface.

Referring to FIG. 3, the surface grading system 20 further includes an angle sensor 48. The angle sensor 48 is operable to sense data related to a pitch angle 92 of the traction unit 22. The pitch angle 92 is defined as an angle of rotation relative to a horizontal plane 50 and about a transverse axis 52 that extends through a center of gravity 54 of the traction unit 22. The transverse axis 52 is disposed on the horizontal plane 50 and is orthogonal to a central longitudinal axis 56 of the traction unit 22. The central longitudinal axis 56 of the traction unit 22 extends through the center of gravity 54 of the traction unit 22, between a forward end 58 and a rearward end 60 of the traction unit 22.

The angle sensor 48 may include any device that is capable sensing the pitch angle 92 and/or data related to the pitch angle 92 of the traction unit 22, and communicate that data to a controller 62. The angle sensor 48 may include, but is not limited to, an accelerometer, a gyroscope, a magnetometer, etc. In one implementation, the angle sensor 48 includes an inertial measurement unit. It should be appreciated that the angle sensor 48 may include some other device capable of detecting and/or sensing data related to the pitch angle 92 of the traction unit 22.

The surface grading system 20 may further include a position sensor 64. The position sensor 64 is operable to sense data related to a geographic location of the traction unit 22. The position sensor 64 may include, but is not limited to, a Global Positioning System (GPS) or other similar device, which uses signals from satellites to triangulate the geographic location of the traction unit 22. The position sensor 64 is configured to continuously track the location of the traction unit 22 as the traction unit 22 moves across the ground surface 26, and continuously communicate the data related to the location of the traction unit 22 to the controller 62. It should be appreciated that the position sensor 64 may differ from the example implementation of the GPS sensor described herein.

The controller 62 is disposed in communication with the angle sensor 48, the position sensor 64, and the actuator 42. The controller 62 may be configured to receive data related to the pitch angle 92 of the traction unit 22 from the angle sensor 48, receive data related to the geographic location of the traction unit 22 from the position sensor 64, and communicate a hitch control signal 82 to the actuator 42 to raise or lower the three-point hitch system 28. While the controller 62 is generally described herein as a singular device, it should be appreciated that the controller 62 may include multiple devices linked together to share and/or communicate information therebetween. Furthermore, it should be appreciated that the controller 62 may be located on the traction unit 22 or the scraper implement 24, or may alternatively may be located remotely from the traction unit 22 and the scraper implement 24.

The controller 62 may alternatively be referred to as a computing device, a computer, a control unit, a control module, a module, etc. The controller 62 includes a processor 66, a memory 68, and all software, hardware, algorithms, connections, sensors, etc., necessary to manage and control the operation of the angle sensor 48, the position sensor 64, and/or the actuator 42. As such, a method may be embodied as a program or algorithm operable on the controller 62. It should be appreciated that the controller 62 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 68 or received via the communication capabilities) to control or communicate with one or more other components. In certain embodiments, the controller 62 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 62 may be in communication with other components on the traction unit 22 and/or the scraper implement 24, such as hydraulic components, electrical components, and operator inputs within an operator station of the traction unit 22. The controller 62 may be electrically connected to these other components by a wiring harness such that messages, commands, and electrical power may be transmitted between the controller 62 and the other components. Although the controller 62 is referenced in the singular, in alternative embodiments the configuration and functionality described herein can be split across multiple devices using techniques known to a person of ordinary skill in the art.

The controller 62 may be embodied as one or multiple digital computers or host machines each having one or more processor, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 68 may include any non-transitory/tangible medium which participates in providing data or computer-readable instructions. The memory 68 may be non-volatile or volatile. Non-volatile media may include, for example, optical or magnetic disks and other persistent memory. Example volatile media may include dynamic random access memory (DRAM), which may constitute a main memory. Other examples of embodiments for the memory include a floppy, flexible disk, or hard disk, magnetic tape or other magnetic medium, a CD-ROM, DVD, and/or any other optical medium, as well as other possible memory devices such as flash memory.

Figure 4:
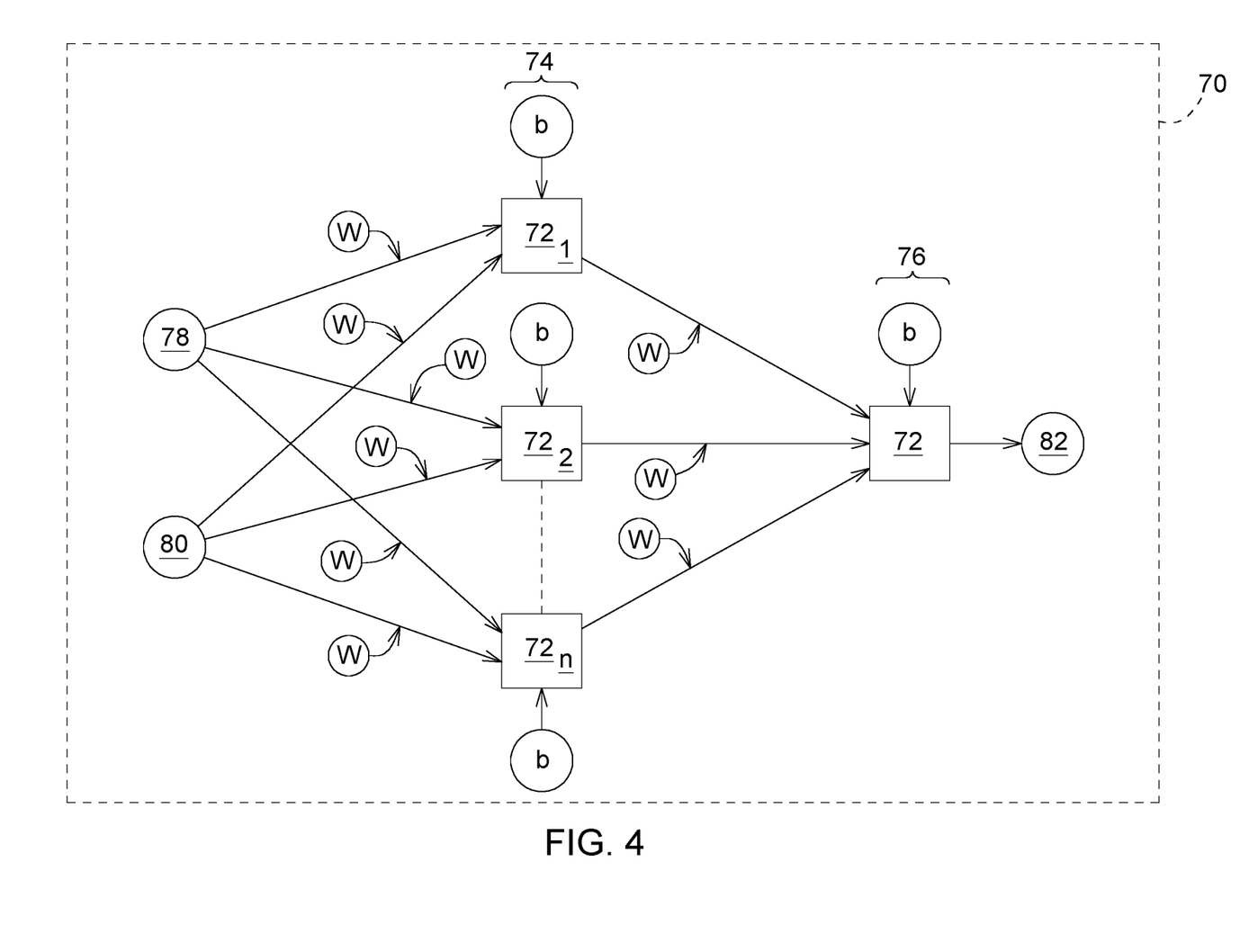
FIG. 4 is a schematic diagram of an artificial neural network of the surface grading system.

The controller 62 includes an Artificial neural network (ANN) 70. An example implementation of the ANN 70 is schematically shown in FIG. 4. As is understood by those skilled in the art, the ANN 70 includes a plurality of connected nodes or neurons, often referred to as artificial neurons 72. Each connection between artificial neurons 72 may transmit a signal therebetween. An artificial neuron 72 may process a signal received as an input or from one artificial neuron 72, and may communicate a signal to other artificial neurons 72 connected to it. The "signal" is a real number, and the output of each artificial neuron 72 is computed by a function of the sum of its inputs. The inputs and the connections between connected artificial neurons 72 typically have a weight W that adjusts as learning proceeds. The weight W increases or decreases the strength of the input or the signal to the artificial neurons 72. Additionally, each artificial neuron 72 may include a bias b, which is a constant that is added to the sum of the inputs and/or received signals of the respective artificial neuron 72. Typically, artificial neurons 72 are aggregated into layers. Different layers may perform different transformations or functions on their respective inputs and/or received signals. Signals travel from a first layer 74 (the input layer), to a last layer (an output layer 76), possibly after traversing the layers multiple times. The ANN 70 is trained and/or learns the parameters required to level the ground surface 26 by being exposed to a set of training data as is understood in the art. The trained ANN 70 automates height control of the cutting edge 40 of the scraper implement 24 to improve the user comfort and quality of work.

In the example implementation of the ANN 70 shown in FIG. 4 and described herein, the ANN 70 receives at least a first input 78 and a second input 80, and includes the first layer 74 and the output layer 76. In the example implementation described herein, the first input 78 is defined as the pitch angle 92, and the second input 80 is defined as a leveling variation 94. The pitch angle 92 and the leveling variation 94 are the input values of the first layer 74. It should be appreciated that the ANN 70 may include other inputs not specifically described herein, such as but not limited to, an engine load, an engine speed, an engine temperature, a transmission speed, a transmission torque, a transmission temperature, etc. The first layer 74 of the ANN 70 may include any number of artificial neurons 72, i.e., 1, 2, 3, . . . n, with each artificial neuron 72 of the first layer 74 including a respective function weight W for each of the inputs, e.g., the pitch angle 92 and the leveling variation 94, and a respective neuron bias b, as is understood by those skilled in the art. The hitch control signal 82 is the output value of the output layer 76. In the example implementation described herein, the output layer 76 includes a single artificial neuron 72, having a respective weight W for each result received from each of the artificial neurons 72 of the first layer 74, and a respective neuron bias b, as is understood by those skilled in the art. The hitch control signal 82 is configured to control a position of the actuator 42, thereby controlling a position of the three-point hitch system 28 relative to the traction unit 22. More particularly, the hitch control signal 82 may be a signal to raise or lower the three-point hitch system 28. The hitch control signal 82 may include, but is not limited to, an electric signal, an electro-hydraulic signal, a pneumatic signal, etc.

As described above, each layer of the ANN 70 may perform a respective function on its respective input values. In the example implementation described herein, the first layer 74 uses a logarithmic sigmoid function (logsig)

$$F^1(s) = \frac{1}{1+e^{-s}}$$

as an activation function of the first layer 74. It should be appreciated that the activation function of the first layer 74 may differ from the logarithmic sigmoid function described in the example implementation. In the example implementation described herein, the second or output layer 76 uses a linear function (purelin) $F^2(s)=s$, as an activation function of the output layer 76. It should be appreciated that the activation function of the output layer 76 may differ from the linear function described in the example implementation.

As described above, the controller 62 includes the tangible, non-transitory memory 68 on which are recorded computer-executable instructions. The instructions may include a grading control algorithm 84. The processor 66 of the controller 62 is configured for executing the grading control algorithm 84. The grading control algorithm 84 implements a method of grading the ground surface 26 with the surface grading system 20, described in detail below.

Figure 6:
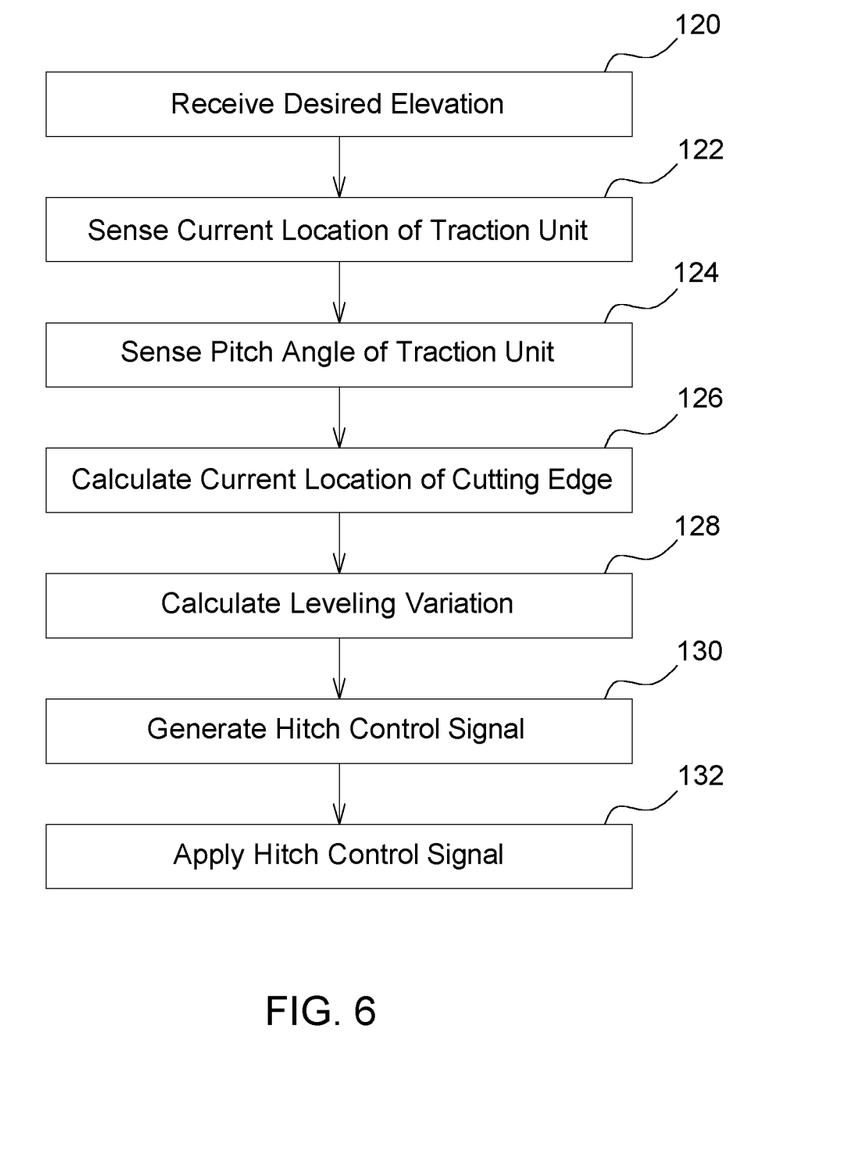
FIG. 6 is a flowchart representing a method of grading the ground surface.

Referring to FIG. 6, the method of grading the ground surface 26 with the surface grading system 20 includes receiving a desired elevation 86 of the ground surface 26. The step of receiving the desired elevation 86 of the ground surface 26 is generally indicated by box in FIG. 6. The desired elevation 86 of the ground surface 26 may be input into the controller 62 by an operator via a user interface 88. The user interface 88 may include, but is not limited to, a touch screen display, a keyboard, a microphone, a data file, etc. The desired elevation 86 of the ground surface 26 may include, but is not limited to, a single geo-referenced elevation establishing a horizontal surface, a plurality of geo-referenced elevations establishing an inclined plane, or a plurality of geo-reference elevations establishing a three-dimensional surface The desired elevation 86 of the ground surface 26 may be input as, but is not limited to, an elevation associated with an established datum, or as an elevation associated with defined reference, mark, or indicator. The indicator may include for example, but is not limited to a laser level or reference marker.

A current location of the traction unit 22, and/or data related to the current location of the traction unit 22, may be sensed with the position sensor 64. The current location of the traction unit 22 may be associated with a specific location or reference point 100 relative to a component of the traction unit 22, such as but not limited to, a specific location on or relative to the position sensor 64. The step of sensing the current location of the traction unit 22 is generally indicated by box 122 in FIG. 6. The data related to the current location of the traction unit 22 and/or the current location of the traction unit 22 may then be communicated to the controller 62, with the controller 62 receiving the data related to the current location of the traction unit 22 from the position sensor 64. As described above, the position sensor 64 may include, but is not limited to, the GPS sensor. The current location of the traction unit 22 may be sensed continuously as the traction unit 22 moves across the ground surface 26, or may be sensed at discrete intervals as the traction unit 22 moves across the ground surface 26 such that the movement of the traction unit 22 across the ground surface 26 may be tracked.

The pitch angle 92 of the traction unit 22 at the current location and/or data related to the pitch angle 92 of the traction unit 22 at the current location of the traction unit 22 is also sensed with the angle sensor 48. The step of sensing the pitch angle 92 of the traction unit 22 is generally indicated by box 124 in FIG. 6. The pitch angle 92 and/or the data related to the pitch angle 92 of the traction unit 22, may then be communicated to the controller 62, with the controller 62 receiving the data related to the pitch angle 92 of the traction unit 22 at the current location of the traction unit 22 from the pitch sensor. The angle sensor 48 may sense and/or determine the pitch angle 92, or may sense the data that is communicated to the controller 62, which in turn calculates or otherwise determines the pitch angle 92 of the traction unit 22 at the current location from the data. The pitch angle 92 of the traction unit 22 at the current location may be sensed continuously as the traction unit 22 moves across the ground surface 26, or may be sensed at discrete intervals as the traction unit 22 moves across the ground surface 26 such that pitch angle 92 of the traction unit 22 may be tracked as the traction unit 22 moves across the field.

The controller 62 may calculate a current location of the cutting edge 40 of the scraper implement 24 using the current location of the traction unit 22, the pitch angle 92 of the traction unit 22 at the current location of the traction unit 22, and an identifiable dimension 90A, 90B of the traction unit 22 or the scraper implement 24. The step of calculating the current location of the cutting edge 40 is generally indicated by box 126 shown in FIG. 6. Calculating the current location of the cutting edge 40 of the scraper implement 24 includes calculating the elevation of the cutting edge 40 of the scraper element. As such, the current location of the cutting edge 40 of the scraper implement 24 includes a geo-referenced location, including a latitude component, a longitude component, and an elevation component of the cutting edge 40 relative to the ground surface 26. Accordingly, the cutting edge 40 of the scraper implement 24 is located relative to the ground surface 26.

As described above, the controller 62 may calculate or otherwise determine the current location of the cutting edge 40 using the current location of the traction unit 22, the pitch angle 92 of the traction unit 22, and an identifiable dimension 90A, 90B of the traction unit 22 or the scraper unit. The identifiable dimension 90A, 90B may include one or more dimensions of the traction unit 22 and/or the scraper implement 24. For example, the identifiable dimension 90A, 90B may include, but is not limited to, a length of the traction unit 22, a wheelbase of the traction unit 22, a length of the scraper implement 24, a distance along a longitudinal axis of the traction unit 22 between a front tire contact position and a rotation point of the three-point hitch system 28, a distance from the rotation point of the three-point hitch system 28 and the cutting edge 40, a distance between the rotation point of the three-point hitch system 28 and the reference location of the position sensor 64, etc. Using the above identified criteria, the controller 62 may calculate the current location of the cutting edge 40 using known mathematical relationships/equations.

Once the location of the cutting edge 40 of the scraper implement 24 has been calculated or otherwise determined, the controller 62 may then calculate the leveling variation 94. The step of calculating the leveling variation 94 is generally indicated by box 128 shown in FIG. 6. The leveling variation 94 is a numerical difference between the current elevation of the cutting edge 40 of the scraper implement 24 and the desired elevation 86 of the ground surface 26 at the current location of the cutting edge 40 of the scraper implement 24.

The controller 62 may generate the hitch control signal 82 based on the pitch angle 92 of the traction unit 22 at the current location of the traction unit 22 and the leveling variation 94. The step of generating the hitch control signal 82 is generally indicated by box 130 shown in FIG. 6. As described above, the hitch control signal 82 is operable to control the three-point hitch system 28 to adjust a vertical position of the cutting edge 40 of the scraper implement 24 relative to the traction unit 22. The hitch control signal 82 may be continuously generated as the traction unit 22 moves across the ground surface 26, or may be generated at discrete intervals as the traction unit 22 moves across the ground surface 26. By so doing, the position of the cutting edge 40 of the scraper implement 24 is continuously adjusted as the traction unit 22 moves across the ground surface 26 to level the ground surface 26 and achieve the desired elevation 86 of the ground surface 26.

As described above, the hitch control signal 82 may include a signal to selectively control the actuator 42 in order to raise or lower the three-point hitch system 28, thereby changing the position of the cutting edge 40 of the scraper implement 24 relative to the traction unit 22. Notably, the elevation of the cutting edge 40 of the scraper implement 24 relative to the ground surface 26 may not change with movement of the actuator 42, but the relative position of the cutting edge 40 relative to the traction unit 22 may change in order to maintain the elevation of the cutting edge 40 relative to the ground surface 26.

In the example implementation described herein, the controller 62 generates the hitch control signal 82 using the ANN 70. As described above, the ANN 70 uses the pitch angle 92 and the leveling variation 94 as the inputs into the first layer 74 of artificial neurons 72. Each artificial neuron 72 of the first layer 74 uses the activation function of the first layer 74, e.g., the logarithmic sigmoid function described above, to perform a mathematical operation of the inputs, and passes the result onto the artificial neurons 72 of the subsequent layer, e.g., the output layer 76 described above. Each artificial neuron 72 of the output layer 76 uses the activation function of the output layer 76, e.g., the liner function described above, to perform a mathematical operation on the results received from the artificial neurons 72 of the first layer 74, and generates an output of the ANN 70.

The output of the ANN 70 is the hitch control signal 82. It should be appreciated that the ANN 70 may be constructed differently than the example implementation described herein, and may include a different number of layers, different numbers of artificial neurons 72 in each layer, and/or use different activation functions at each layer than those described herein.

The controller 62 may then apply the hitch control signal 82 to the actuator 42 of the three-point hitch system 28. The step of applying the hitch control signal 82 to the actuator 42 is generally indicated by box 132 shown in FIG. 6. The hitch control signal 82 is applied to the actuator 42 in order to adjust the vertical position of the cutting edge 40 of the scraper implement 24 relative to the traction unit 22. As described above, the hitch control signal 82 may be a signal or command to raise or lower the three-point hitch system 28. As such, once the hitch control signal 82 is applied to the actuator 42, the actuator 42 moves in response to the hitch control signal 82, e.g., extending or retracting, whereby the vertical position of the cutting edge 40 of the scraper implement 24 relative to the traction unit 22 is altered.

The controller 62 continuously generates the hitch control signal 82 to continuously adjust the vertical position of the cutting edge 40 of the scraper implement 24 as the traction unit 22 moves across the ground surface 26. As such, as the current position of the traction unit 22 and the pitch angle 92 of the traction unit 22 changes, the controller 62 calculates the leveling variation 94 and generates the hitch control signal 82. This continuous process enables the controller 62 to automatically grade the ground surface 26 to the desired elevation 86 of the ground surface 26. The above described surface grading system 20 and method of grading the ground surface 26 reduces the skill level required by the operator to achieve the desired elevation 86 of the ground surface 26, and may reduce the time and cost of grading the ground surface 26 to the desired elevation 86 when compared to a non-automated grading system.

Figure 5:
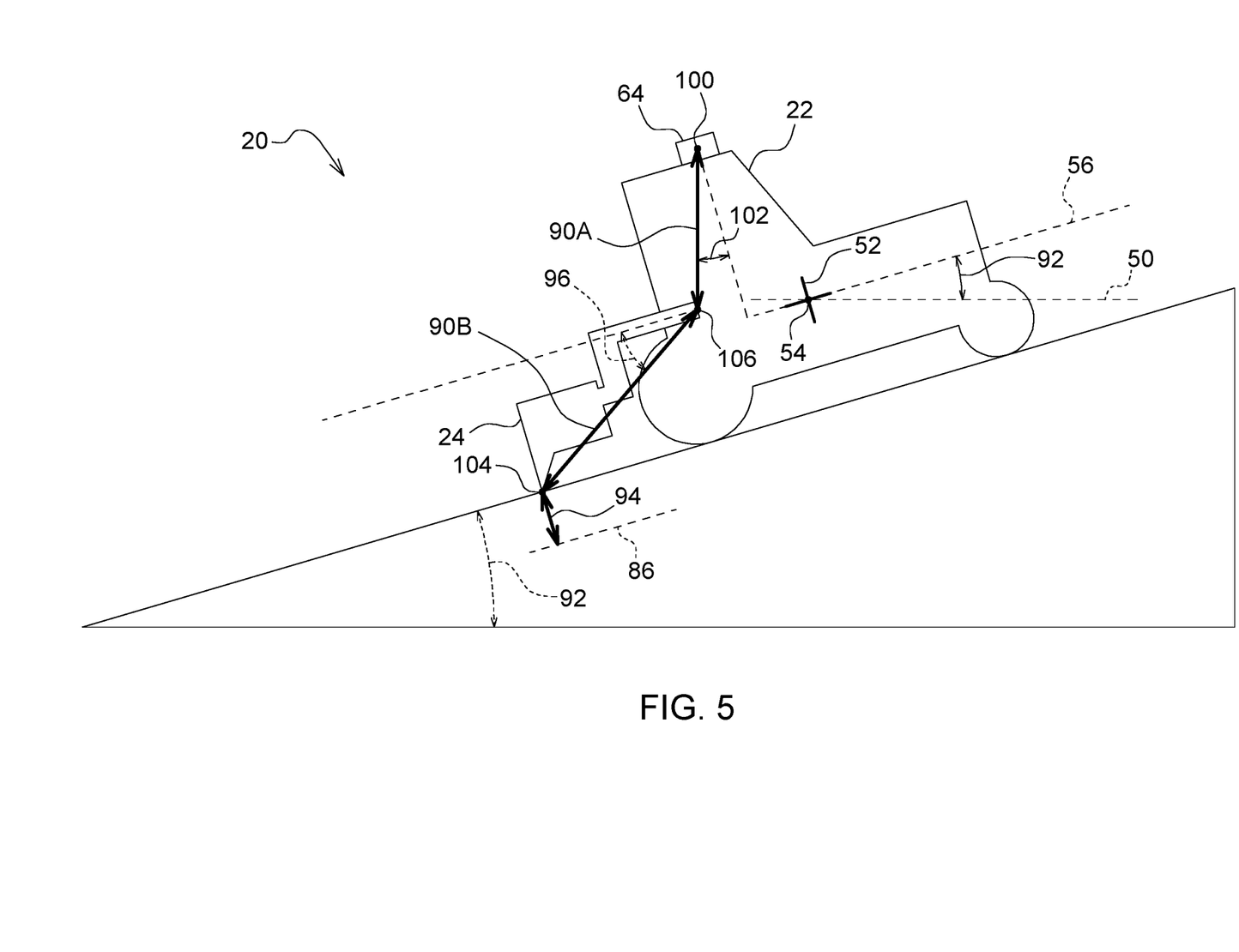
FIG. 5 is a schematic side profile view of the surface grading system.

Referring to FIGS. 3 and 5, calculation of current location of the cutting edge 40, including the elevation of the cutting edge 40, as well as the leveling variation 94, are further explained. Point 100 represents the reference location of the position sensor 64, point 104 represents the location of the cutting edge 40 of the scraper implement 24, and a point 106 represents a point of rotation relative to the traction unit 22 of the three-point hitch system 28. In the example implementation, the current location of the traction unit 22 is associated with point 100. It should be appreciated that the calculation of the current location of the cutting edge 40 may differ from the example implementation, and is dependent upon the specific portion of the traction unit associated with the current location 100 of the traction unit 22. In other words, if the current location 100 of the traction unit 22 is associated with a location of the traction unit 22 other than the reference location 100 of the position sensor 64 described herein, then the mathematical calculations of the current location of the cutting edge 40 may differ from the example implementation described herein.

As shown in FIGS. 3 and 5, a length or distance between the reference location 100 of the position sensor 64 and the point 106 representing the point of rotation of the three-point hitch system 28 relative to the traction unit 22 may be defined as an identifiable dimension 90A, and may be measured and/or otherwise known. A length or distance between the point 106 representing the point of rotation of the three-point hitch system 28 relative to the traction unit 22 and the cutting edge 40 may be defined as an identifiable dimension 90B and may be measured and/or otherwise known. The location of point 104 relative to point 100 may be derived from the relative position of point 100, the pitch angle 92, an angle 96, and an angle 102. The pitch angle 92 is represented as δ in the equations below. The angle 96 is an angle formed between a line segment passing through the reference point 106 and parallel with the central longitudinal axis 56, and a vector representing identifiable dimension 90B. The angle 96 is represented as β in the equations below. The angle 102 is an angle formed between a line segment passing through the reference point 100 and normal to the central longitudinal axis 56, and a vector representing identifiable dimension 90A. The angle 102 is represented as θ in the equations below.

The position of reference point 100, e.g., the current location of the traction unit 22, is defined in the equations below as A=[$A_x$,$A_y$]. The scraper implement 24 is pivoted relative to the traction unit 22 at point 106, which represents the fixed point in the three-point hitch system 28 that moves the cutting edge 40, i.e., point 104, relative to the traction unit 22. The location of point 106 is defined in the equations below as B=[$B_x$,$B_y$]. The location of point 106 may be derived from equation (1) below using the location of the reference point 100, defined as A=[$A_x$,$A_y$], the identifiable dimension 90A, the pitch angle 92, and the angle 102.

$$B[B_x, B_y] = [(A_x - 90A \times \sin(\delta - \theta)), (A_y - 90A \times \cos(\delta - \theta))] \quad (1)$$

Referring to FIGS. 3 and 5, the variable position of the cutting edge 40 of the scraper implement 24 is represented by point 104. Knowing the relative position of point 100, which may be determined from the position sensor 64 for example, the location of point 104 of the cutting edge 40 may be calculated. The location of point 104 is defined in the equations below as C'=[$C_x'$, $C_y'$]. The location of point 104 is affected by the pitch angle 92 of the traction unit 22, represented in the equations by angle δ, and by the angle 96 represented in the equations by β. Angle 96 is controlled and/or adjusted by the hitch control signal 82. In the example implementation described herein, the hitch control signal 82 is generated by the ANN 70. The location of point 104 of the cutting edge 40 of the scraper implement 24 is represented as C'=[$C_x'$,$C_y'$] in equation (2), shown below.

$$C'[C_x', C_y'] = [(B_x - (90B \times \cos(\theta + \beta))), (B_y - (90B \times \sin(\theta + \beta)))] \quad (2)$$

The ground leveling variation 94 is derived from comparing the y component of point 104, i.e., as $C_y'$ with the y component $R_y$ of the desired elevation 86 of the ground surface 26 at the current location of the cutting edge 40 of the scraper implement 24. The leveling variation 94 may be calculated from equation (3) below.

$$\text{Leveling Variation} = C_y' - R_y \quad (3)$$

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of grading a ground surface with a traction unit having a three-point hitch system, and a scraper implement attached to the three-point hitch system and drawn behind the traction unit, the method comprising:
   sensing a pitch angle of the traction unit at a current location of the traction unit with an angle sensor, and communicating the pitch angle of the traction unit to a controller;
   calculating a leveling variation with the controller, wherein the leveling variation is a numerical difference between a current elevation of a cutting edge of the scraper implement and a desired elevation of the ground surface at a current location of the cutting edge of the scraper implement; and
   generating a hitch control signal with the controller based on the pitch angle of the traction unit and the leveling variation, wherein the hitch control signal is operable to control the three-point hitch system to adjust a vertical position of the cutting edge of the scraper implement relative to the traction unit.

2. The method set forth in claim 1, wherein the controller includes an Artificial Neural Network configured to receive the pitch angle and the leveling variation as input values, and output the hitch control signal as an output value.

3. The method set forth in claim 2, wherein the Artificial Neural Network of the controller includes a first layer using a logarithmic sigmoid function as an activation function of the first layer.

4. The method set forth in claim 2, wherein the Artificial Neural Network of the controller includes an output layer using a linear function as an activation function of the output layer.

5. The method set forth in claim 1, further comprising sensing a current location of the traction unit with a position sensor, and communicating the current location of the traction unit to the controller.

6. The method set forth in claim 5, further comprising calculating the current location of the cutting edge of the scraper implement using the current location of the traction unit, the pitch angle of the traction unit at the current location of the traction unit, and an identifiable dimension of the traction unit or the scraper implement.

7. The method set forth in claim 6, wherein calculating the current location of the cutting edge of the scraper implement includes calculating the elevation of the cutting edge of the scraper element.

8. The method set forth in claim 1, further comprising inputting the desired elevation of the ground surface into the controller.

9. The method set forth in claim 1, further comprising moving an actuator of the three-point hitch system in response to the hitch control signal, whereby the vertical position of the cutting edge of the scraper implement relative to the traction unit is altered.

10. A surface grading system comprising:
a traction unit including a three-point hitch system having an actuator selectively controllable between a plurality of different positions;
a scraper implement attached to the three-point hitch system, the scraper implement including a cutting edge configured for shaping a ground surface, wherein a position of the cutting edge relative to the traction unit is adjustable in response to movement of the actuator;
an angle sensor operable to sense data related to a pitch angle of the traction unit;
a controller in communication with the angle sensor and the actuator, and including a processor and a memory having a grading control algorithm stored thereon, wherein the processor is operable to execute the grading control algorithm to:
receive a desired elevation of the ground surface;
receive a pitch angle of the traction unit at a current location of the traction unit from the angle sensor;
calculate a leveling variation, wherein the leveling variation is a numerical difference between a current elevation of the cutting edge of the scraper implement and the desired elevation of the ground surface at a current location of the cutting edge of the scraper implement;
generate a hitch control signal based on the pitch angle of the traction unit and the leveling variation; and
apply the hitch control signal to the actuator of the three-point hitch system to adjust a vertical position of the cutting edge of the scraper implement relative to the traction unit.

11. The surface grading system set forth in claim 10, wherein the controller includes an Artificial Neural Network configured to receive the pitch angle and the leveling variation as input values, and output the hitch control signal as an output value.

12. The surface grading system set forth in claim 11, wherein the Artificial Neural Network of the controller includes a first layer using a logarithmic sigmoid function as an activation function of the first layer.

13. The surface grading system set forth in claim 11, wherein the Artificial Neural Network of the controller includes an output layer using a linear function as an activation function of the output layer.

14. The surface grading system set forth in claim 10, wherein the angle sensor includes an inertial measurement unit.

15. The surface grading system set forth in claim 10, further comprising a position sensor operable to sense data related to a geographic location of the traction unit.

16. The surface grading system set forth in claim 15, wherein the controller is in communication with the position sensor for receiving the data related to the geographic location of the traction unit.

17. The surface grading system set forth in claim 16, wherein the processor is operable to execute the grading control algorithm to calculate the current location of the cutting edge of the scraper implement using the current location of the traction unit, the pitch angle of the traction unit at the current location of the traction unit, and an identifiable dimension of the traction unit or the scraper implement.

18. The surface grading system set forth in claim 17, wherein the processor is operable to execute the grading control algorithm to calculate the elevation of the cutting edge of the scraper element.

19. The surface grading system set forth in claim 10, wherein the three-point hitch system includes a first lower arm and a second lower arm arranged on a substantially common plane, and an upper arm positioned vertically above and laterally between the first lower arm and the second lower arm, with the actuator coupled to one of the first lower arm, the second lower arm, or the upper arm.

20. The surface grading system set forth in claim 10, wherein the processor is operable to execute the grading control algorithm to continuously generate the hitch control signal to continuously adjust the vertical position of the cutting edge of the scraper implement as the traction unit moves across the ground surface.

21. A surface grading system comprising:
a traction unit having a scraper implement attached thereto, the scraper implement including a cutting edge configured for shaping a ground surface;
an actuator selectively controllable between a plurality of different positions and interconnecting the traction unit and the scraper implement, whereby movement of the actuator adjusts a position of scraper implement relative to the traction unit;
an angle sensor operable to sense data related to a pitch angle of the traction unit;
a position sensor operable to sense data related to a location of the traction unit;
a controller in communication with the angle sensor, the position sensor, and the actuator, wherein the controller includes a processor and a memory having a grading control algorithm stored thereon, wherein the processor is operable to execute the grading control algorithm to:
receive a desired elevation of the ground surface;
receive a pitch angle of the traction unit at a current location of the traction unit from the angle sensor;
calculate a leveling variation, wherein the leveling variation is a numerical difference between a current elevation of the cutting edge of the scraper implement and the desired elevation of the ground surface at a current location of the cutting edge of the scraper implement;
generate a hitch control signal based on the pitch angle of the traction unit and the leveling variation; and
apply the hitch control signal to the actuator to adjust a vertical position of the cutting edge of the scraper implement relative to the traction unit; and
wherein the controller includes an Artificial Neural Network configured to receive the pitch angle and the leveling variation as input values, and output the hitch control signal as an output value.

22. The surface grading system set forth in claim 21, wherein the Artificial Neural Network of the controller includes a first layer using a logarithmic sigmoid function as an activation function of the first layer.

23. The surface grading system set forth in claim 21, wherein the Artificial Neural Network of the controller includes an output layer using a linear function as an activation function of the output layer.

24. The surface grading system set forth in claim 21, wherein the traction unit includes a three-point hitch system interconnecting the traction unit and the scraper implement, with the actuator coupled to the three-point hitch system.

* * * * *